United States Patent [19]
Krafka et al.

[11] Patent Number: 4,725,026
[45] Date of Patent: Feb. 16, 1988

[54] WING WITH EXTENDABLE FLAP AND VARIABLE CAMBER

[75] Inventors: Herfried Krafka, Toulouse; Henry Jendrian, Tournefeuille, both of France

[73] Assignee: Deutsche Airbus GmbH, Munich, Fed. Rep. of Germany

[21] Appl. No.: 891,359

[22] Filed: Jul. 29, 1986

[30] Foreign Application Priority Data

Jul. 31, 1985 [DE] Fed. Rep. of Germany ....... 3527497

[51] Int. Cl.$^4$ .............................. B64C 3/44; B64C 3/58
[52] U.S. Cl. ..................................... 244/219; 244/213; 244/215
[58] Field of Search ............... 244/212, 213, 214, 215, 244/216, 217, 219

[56] References Cited

U.S. PATENT DOCUMENTS

| | | | |
|---|---|---|---|
| 1,422,616 | 7/1922 | Page | 244/215 |
| 2,137,879 | 11/1938 | Ksoll | 244/215 |
| 2,348,150 | 5/1944 | Richter | 244/216 |
| 2,405,726 | 8/1946 | Zap | 244/213 |
| 2,791,385 | 5/1957 | Johnson | 244/213 |
| 2,938,680 | 5/1960 | Greene et al. | 244/214 |
| 4,361,299 | 11/1982 | Sharrock | 244/219 |
| 4,427,168 | 1/1984 | McKinney et al. | 244/219 |
| 4,471,927 | 9/1984 | Rudolph et al. | 244/215 |
| 4,471,928 | 9/1984 | Cole | 244/215 |

Primary Examiner—Joseph F. Peters, Jr.
Assistant Examiner—Lynn M. Fiorito
Attorney, Agent, or Firm—Toren, McGeady & Associates

[57] ABSTRACT

A wing having a cantilevered support for changing the camber thereof is attached at a stressed wing portion so as to be pivotable about an axis rigidly attached to the wing. Sliding carriages having gear wheels are attached in a guide channel in the wing cantilevered support and a toothed rack attached at a landing flap is guided between the gear wheels so that the distance traveled by the sliding carriage can be selected to be different from the distance through which the flap travels during lowering or extension thereof. Actuation of the landing flap occurs by means of a hinged crank and a connecting rod which drives the sliding carriage and, in order to cover a gap between the flap and a spoiler which is provided, the spoiler is designed with a flexible configuration.

6 Claims, 5 Drawing Figures

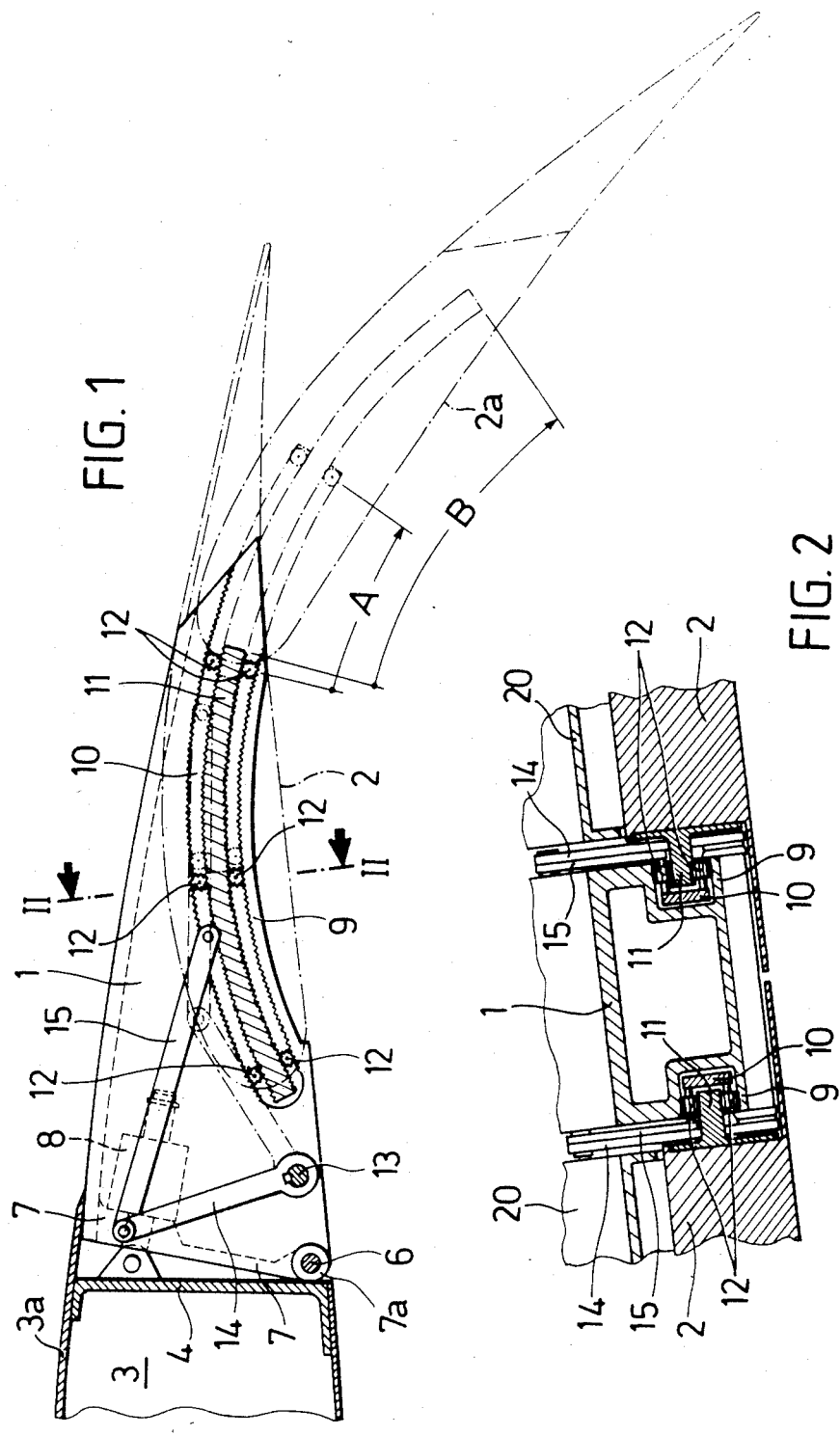

WING WITH EXTENDABLE FLAP AND VARIABLE CAMBER

BACKGROUND OF THE INVENTION

1. Field of the invention:

The present invention is directed toward aircraft structures and, more particularly, to the structure of a wing and flap assembly. Particularly, the invention is directed toward a construction for a wing having an extendable flap and a variable camber.

2. Description of Related Art:

A wing of the type to which the present invention relates is known, for example, from DE-OS No. 30 39 121. In this arrangement, an intermediate wing is arranged between a fixed front wing portion and a flap or rudder which, in the case of a flap displacement or of a change of the wing camber, must also be moved. The adjustment of the intermediate wing and the flap occurs in sliding guides with rollers. Movements of the intermediate wing and the flap are, in this case, necessarily connected with each other so that in case of, for example, a larger deflection of the intermediate wing, there is necessarily formed a gap between it and the flap.

SUMMARY OF THE INVENTION

The present invention is directed toward provision of a wing with an extendable flap and a variable camber in which the extension of the flap and the change in the camber can be actuated collectively or separately from each other in a simple manner and wherein a gap formation between the flap and a spoiler is prevented or allowed to occur. According to the invention, an aircraft wing assembly, having a wing fastened by a cantilevered support to a stressed wing portion, is provided with at least one flap member adapted to be rearwardly and downwardly extended from a trailing wing portion of the wing. An open-ended guide channel is formed in the cantilevered support within which the flap is movable and a sliding carriage equipped with gear wheels is displaceable within the channel by means of hinged rods interposed between the wing and the sliding carriage. A toothed rack on the flap member engages with the gear wheels on the sliding carriage in order to displace the flap. The gear wheels on the sliding carriage and the toothed rack are formed with a step-up ratio therebetween such that the distance traveled by the flap during extension thereof from the wing is greater than the distance traveled by the toothed rack. The wing and the flap are jointly mounted for pivotal movement about an axis for varying the wing camber and a spoiler is pivotally supported at a rear spar of the wing retained for resting at the flap under preload, with the spoiler being movable by an actuator.

The essential advantage of the invention consists in that the structure thereof enables the extension of the flap and the change in the camber to be performed simply with separate actuating elements. This is achieved in that all actuation elements for the flap are arranged within the cantilevered supports and those for changing the camber are rigidly attached to the wing. With the invention, all parts of these actuating elements are arranged within the contour of the cantilevered supports, and, thus, do not interfere with the airflow around the wing.

Of particular advantage is the fact that the gear wheels and the sliding carriage in the guide channels of the cantilevered supports coact with toothed racks at the flap, because, in this manner, considerably larger extension travels of the flaps compared to the sliding carriage movements in the guide channels are made possible. If several flaps are used, a central cantilevered support can comprise the guide channel with the sliding carriages and the gear wheels, whereby material and fabrication efforts can be conserved as compared to known designs in which each flap must have its own cantilevered support or intermediate wing.

It is also possible with the invention to prestress the spoiler for better adaptation to the flap and to provide it with slots. The guide channels in the cantilevered supports can be selectively designed and adapted to the function of the flaps as far as the shape and length of the guide channels are concerned. Thus, there exists the possibility, if the flaps act as ailerons, of limiting the extension travel and not providing a gap between the extended flap and the spoiler, or of designing flaps with a large extension travel and a gap to correspond to a landing flap arrangement.

There is an additional advantage in that the invention can also be used for flaps at the wing leading edge.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there is illustrated and described a preferred embodiment of the invention.

BRIEF DESCRIPTION OF THE DRAWINGS

In the drawings:

FIG. 1 is a partial section through a rear portion of a wing showing the kinematics for extension of a landing flap, the partial section extending in a chord direction;

FIG. 2 is a section along II—II through FIG. 1;

DETAILED DESCRIPTION OF THE PREFERRED EMBODIMENT

Figure 3:
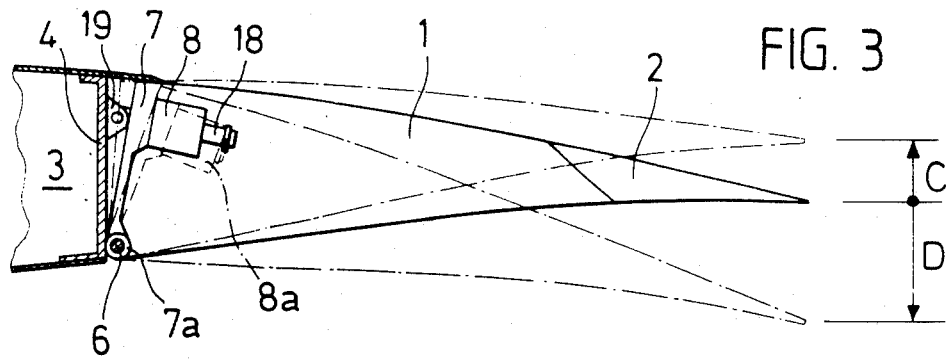
FIG. 3 is a highly simplified sketch illustrating, for demonstration purposes, a change in the camber of the rear wing portion.

Referring now to the drawings and particularly to FIG. 1, there is shown a cantilevered support 1 for a landing flap 2 presented in broken-dotted lines arranged at a wing rear portion 3 so as to be pivotable around an axle 6 hinged at a wing rear spar 4. The cantilevered support is stiffened by a fitting 7 at its end facing the wing spar 4, which fitting also comprises a bearing boss 7a for the axle 6. An actuator 8, shown in broken lines at the fitting 7, functions in a manner to be explained hereinafter with reference to FIG. 3. A guide channel 9 is attached at the side at the cantilevered support viewed in a chord direction, in which a sliding carriage 10 is moved back and forth.

The sliding carriage 10 is equipped with six gear wheels 12 having teeth which mesh with a toothed track 11 and arranged between the gear wheels attached to the landing flap 2. The landing flap 2 is extended or retracted in the direction of the guide channel 9 by movement of the sliding carriage 10 caused by engagement of the gear wheels 12 and the toothed rack 11. The sliding carriage 10 is actuated by a rotating shaft 13 which is driven, for example, by an electrical or hydraulic motor (not shown). A hinged crank 14 is positioned upon the rotating shaft 13 and, on its part, is connected with a connecting rod 15 which drives the sliding carriage 10.

The actuating elements for the retracted landing flap 2 are depicted in solid lines in FIG. 1. The presentation in broken lines shows the actuating elements for the extended landing flap 2a. Because of the step-up ratio between the gear wheels 12 and the toothed rack 11, it is possible to achieve travel distance B of the landing flap 2 during extension thereof from the wing which is twice the distance A through which the sliding carriage 10 moves. A spoiler 20 pivotably arranged at the rear spar 4 on the side of the cantilevered support 1, partially covers the flap 2.

The basic illustration of the actuating elements for a landing flap according to FIG. 1 can also be utilized with a slightly changed arrangement for the extension of an aileron, of another control surface or a leading edge wing flap or of some other flap. The guide channel 9 can be positioned in such a way that after the extension and in the appropriate position of the rudder or the flap, there remains a gap between the control surfaces and the spoiler 20 or that formation of a gap is prevented.

The sectional view of FIG. 2 shows that the cantilevered support 1 is provided with guide channels 9 and actuating elements 10–15 for landing flaps 2 arranged on both sides thereof. In this embodiment, the sliding carriages 10 are connected with each other by a bracket for satisfactory parallel synchronization and for reasons of clarity, this connection is not depicted here.

FIG. 3 illustrates, in a greatly simplified manner, the actuation of the cantilevered support 1 together with the landing flap 2 for the purpose of changing the camber of the wing. The fitting 7 with the bearing boss 7a for the axle 6 attached in the cantilevered support 1, also carries the actuator 8 which can move a spindle 18 or which moves along the spindle 18. The spindle 18 is hinged at the wing spar 4 with an attachment boss 19. The movement in both directions of the actuator 8 upon the spindle 18 produces, for example, a rotating movement of the cantilevered support 1 around the axle 6, whereby a variable camber of the wing or airfoil profile is achieved. According to the outline of the cantilevered support 1 with the landing flap 2 illustrated in broken-dotted lines, a travel change of the landing flap tip by an amount C upwards and by an amount D downwards is achievable in the illustrated case. The presentation in broken-dotted lines of the actuator 8a corresponds to the extension amount D traveled downwardly.

Figure 4:
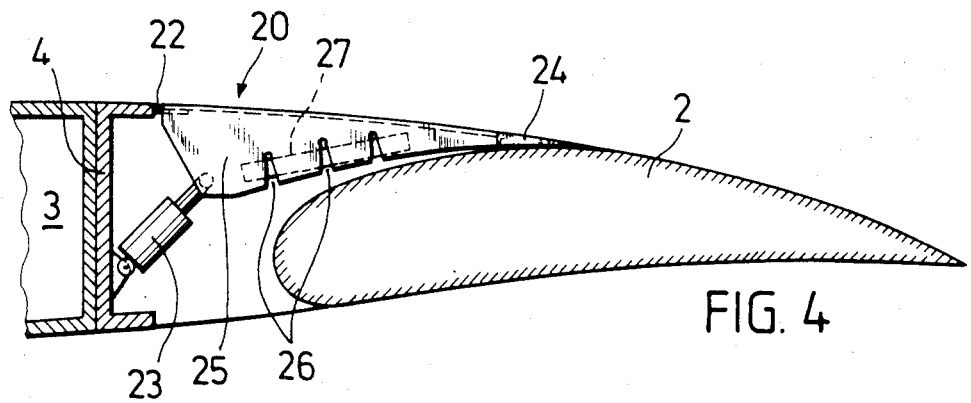
FIG. 4 is a side view of a spoiler arranged between the fixed wing portion and the flap.
Figure 5:
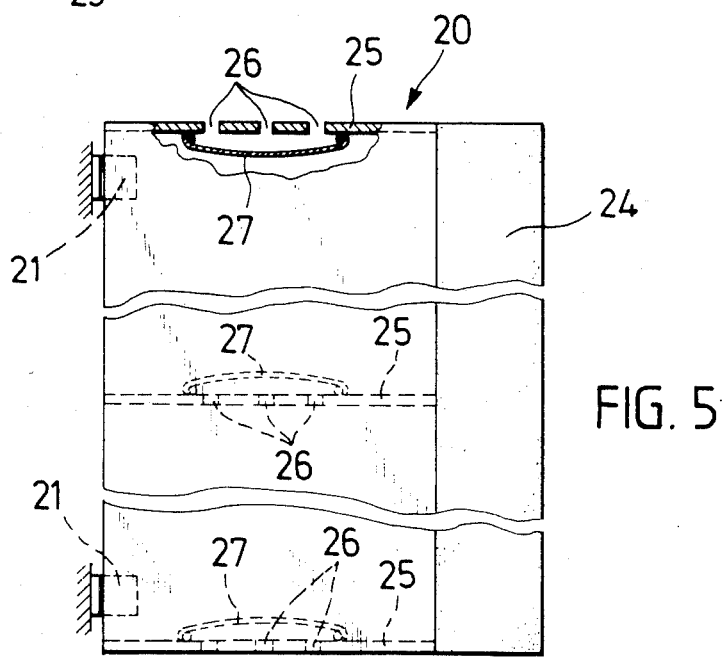
FIG. 5 is a plan view of a spoiler according to FIG. 4.

As illustrated in FIGS. 4 and 5, the upper cover of the space between the wing spar 4 and the landing flap 2 is designed as a spoiler 20. Here, for purposes of facilitating explanation, only the parts essential for the spoiler 20 are illustrated. The spoiler 20 is rotatably supported around a fulcrum 22 at the wing spar 4 with fittings 21, schematically presented in FIG. 5 only, and it is powered by an actuator 23 attached in a hinged fashion at the wing spar 4. In order to avoid the necessity for the spoiler 20 to be carried along during a camber change by means of additional kinematics, said spoiler is designed to be elastic in the chord direction of the wing. The spoiler 20 is prestressed by means of a leaf spring 27 resulting in a camber and the actuator presses, herein with a preload, a trailing edge 24 of the spoiler 20 consisting of nonabrasive plastic against the landing flap 2, wherein the spoiler 20 is provided with webs 25 at the ends and at the center viewed in the direction of the wing span. The webs 25 are equipped with recesses 26.

After extension of the landing flap 2, the spoiler 20 can bend downwardly only until the recesses 26 are closed so that their sides lie one upon the other. Thus, the spoiler deflection downwardly is limited with the help of the recesses 26. Because of this design of the spoiler 20, it rests against the flap 2 in spite of different adjustments of the wing camber up to the desired position of said flap 2 in order to, however, then, for example, in its end position, form a gap between the flap and its limited deflected position.

Thus, from the foregoing, it will be seen that the present invention provides a cantilevered support 1 for changing the camber of the wing which is attached at the stressed wing portion 4 to be pivotable around an axle 6 rigidly attached to the wing. Sliding carriages 10 with gear wheels 12 are attached in a guide channel 9 in the cantilevered support 1. A toothed rack 11 attached at the landing flap 2 is guided in such a manner between the gear wheels 12 that the travel A of the sliding carriage 10 can be chosen to differ from the extension travel B. Actuation of the landing flap 2 occurs by means of a hinged crank 14 and a connecting rod 15 which drives the sliding carriage 10. In order to cover the gap between the flap 2 and the spoiler 20, the spoiler 20 is designed to be flexible.

While a specific embodiment of the invention has been shown and described in detail to illustrate the application of the inventive principles, it will be understood that the invention may be embodied otherwise without departing from such principles.

What is claimed is:

1. A wing having a cantilever support fastened to a stressed wing portion, at which is attached a flap covered, at least in part, by a spoiler and forming part of the wing airfoil section, said flap being extendable rearwardly and downwardly and is pivotable in order to change a camber of the wing, wherein the cantilever support comprises a guide channel open towards the flap and extending in a direction of an extension movement of the flap, a sliding carriage displaceable by link rods is guided in said guide channel, and the spoiler is actuated by an actuator, characterized in that:
   (a) the spoiler includes at least two webs protruding into the wing contour, each of said webs including a plurality of recesses for limiting the camber of the wing;
   (b) a device for preloading the spoiler against the flap; and
   (c) the sliding carriage includes lateral gear wheels and the flap includes a toothed rack positioned between the gear wheels and having sets of teeth arranged along a top and bottom sides for engaging the gear wheels, said toothed rack, during displacement of the sliding carriage, being moved in the same direction, wherein a gear ratio between the gear wheels attached at the sides of the sliding carriage and the teeth of the toothed rack, causes the flap to cover a longer extension travel than the displacement travel of the sliding carriage.

2. A wing according to claim 1, characterized in that said preloading device comprises a spring element on each of said webs overlapping the recesses therein for producing the preload of the spoiler.

3. A wing according to claim 1, characterized in that said wing includes two flaps, the cantilever support being arranged between the two flaps, each flap including a separate toothed rack and sliding carriage with gear wheels displacement by linked rods, wherein the flaps can be actuated either simultaneously or independently of each other by means of the linked rods and the sliding carriages.

4. A wing according to claim 1, characterized in that the guide channel in the cantilever support is designed in such a way that a gap exists between the flap and the spoiler when the flap is completely extended, while the gap is prevented from being formed in intermediate positions of the flap.

5. A wing according to claim 1, characterized in that the pivoting of the flap for changing the wing camber occurs by pivoting the cantilevered support by a drive mounted at the cantilever support which actuates a spindle articulated at the wing and at the flap.

6. A wing according to claim 1, characterized in that the displacement of the sliding carriages by the link rods for extending the flap rearwards and downwards, and the actuation of the drive mounted at the cantilever support for pivoting the flap for changing the wing camber are performed either simultaneously or independently of each other.

* * * * *